US008190210B2

(12) United States Patent
Vicente

(10) Patent No.: US 8,190,210 B2

(45) Date of Patent: May 29, 2012

(54) TELECOMMUNICATIONS OBELISK WITH CELLULAR NETWORK COLOCATION

(76) Inventor: Manuel Vicente, Goldens Bridge, NY (US)

(*) Notice: Subject to any disclaimer, the term of this patent is extended or adjusted under 35 U.S.C. 154(b) by 315 days.

(21) Appl. No.: 12/557,626

(22) Filed: Sep. 11, 2009

(65) Prior Publication Data

US 2010/0069121 A1 Mar. 18, 2010

Related U.S. Application Data

(60) Provisional application No. 61/096,528, filed on Sep. 12, 2008.

(51) Int. Cl.
*H04M 1/00* (2006.01)
*H04K 3/00* (2006.01)

(52) U.S. Cl. ........................ 455/561; 455/66.1; 343/890

(58) Field of Classification Search .................. 343/890; 455/66.1, 561
See application file for complete search history.

(56) References Cited

U.S. PATENT DOCUMENTS 5,969,693 A * 10/1999 Legg ............................ 343/890

OTHER PUBLICATIONS

Bernd das Brot Team, Obelisk Cell Tower—Irvine, CA—Disguised Cell Towers on Waymarking.com (p. 1), Jun. 28, 2008.*
http://www.roadsideamerica.com/tip/11245, printed on Sep. 3, 2008.
http://www.roadsideamerica.com/tip/11245, printed on Sep. 5, 2008.

* cited by examiner

*Primary Examiner* — Lee Nguyen
(74) *Attorney, Agent, or Firm* — Lerner, David, Littenberg, Krumholz & Mentlik, LLP

(57) ABSTRACT

A telecommunications tower is formed as an obelisk and permits collocation of multiple telecommunications network carriers. The tower includes a façade shaped like an obelisk over a frame structure and is designed to blend with the surrounding architecture and landscape. The obelisk façade disguises the internal support frame structure and antenna arrays within the tower. The obelisk and support frame are constructed above a base structure. The base structure may include multiple levels or rooms. Each level may permit storage of cellular communications equipment. The design features of the tower permit collocation of multiple carriers within a common tower.

9 Claims, 7 Drawing Sheets

TELECOMMUNICATIONS OBELISK WITH CELLULAR NETWORK COLOCATION

CROSS-REFERENCE TO RELATED APPLICATIONS

This application claims the benefit of the filing date of U.S. Provisional Patent Application No. 61/096,528 filed Sep. 12, 2008, the disclosure of which is hereby incorporated herein by reference.

1. FIELD OF THE TECHNOLOGY

The present technology relates to telecommunications towers for cellular networks. More specifically, it relates to the external and internal structures of the telecommunications tower and features thereof to permit collocation by multiple mobile phone network carriers.

2. BACKGROUND OF THE TECHNOLOGY

Network infrastructure for cellular communications typically includes telecommunication towers for transmitting and receiving mobile phone signals for users of the network. Generally, these telecommunications towers are large metal structures with little to no aesthetically appealing characteristics. Such towers detract from the general appearance of the landscape and therefore may be undesirable to businesses or communities in the area.

It may be desirable to improve the design of existing telecommunications towers in a manner to permit aesthetic improvements and/or permit collocation of multiple carriers within a common tower.

3. SUMMARY OF THE TECHNOLOGY

Aspects of the present technology include a radio communications apparatus. In an example embodiment, the apparatus may include an internal tower support frame and a radio frequency transparent façade. The façade and internal tower support frame are coupled together to form an obelisk. The obelisk may have a monolithic exterior shaft comprising four upwardly tapering side surfaces and top pyramid surfaces. An antenna array may be housed within the obelisk and coupled to at least one antenna support of the internal tower support frame. A base structure supports the internal tower support frame and includes a communications equipment room.

In some embodiments, the base structure may also include a plurality of communications equipment rooms. Moreover, the plurality of communications equipment rooms may be vertically stacked upon each other.

In still further embodiments, the internal tower support frame comprises supports for a plurality of antenna arrays. The supports for each antenna array may be separated by a vertical distance along the internal tower support frame. Furthermore, the internal tower support frame may comprise a plurality of antenna arrays.

In some embodiments, the internal tower support frame forms an internal vertical shaft having a rectangular boundary. Furthermore, the communications equipment room may include a communications cable aperture or conduit formed to permit cable access between the communications equipment room and the internal vertical shaft. In still further embodiments, the rectangular boundary of the internal tower support frame is substantially aligned with the four side surfaces of the exterior shaft of the obelisk.

In still further embodiments of the technology, a set of antenna array supports are coupled to the internal tower support and are each aligned at a skewed angle with respect to the four side surfaces of the exterior shaft of the obelisk. The angle may be, for example, approximately 45 degrees. In a typical embodiment, the antenna array of the radio communications apparatus may be a cellular phone network antenna array.

Further embodiments and features of the present technology will be apparent from the following detailed disclosure, abstract, drawings and the claims.

4. BRIEF DESCRIPTION OF DRAWINGS

The present technology is illustrated by way of example, and not by way of limitation, in the figures of the accompanying drawings, in which like reference numerals refer to similar elements including:

5. DETAILED DESCRIPTION

Figure 1:
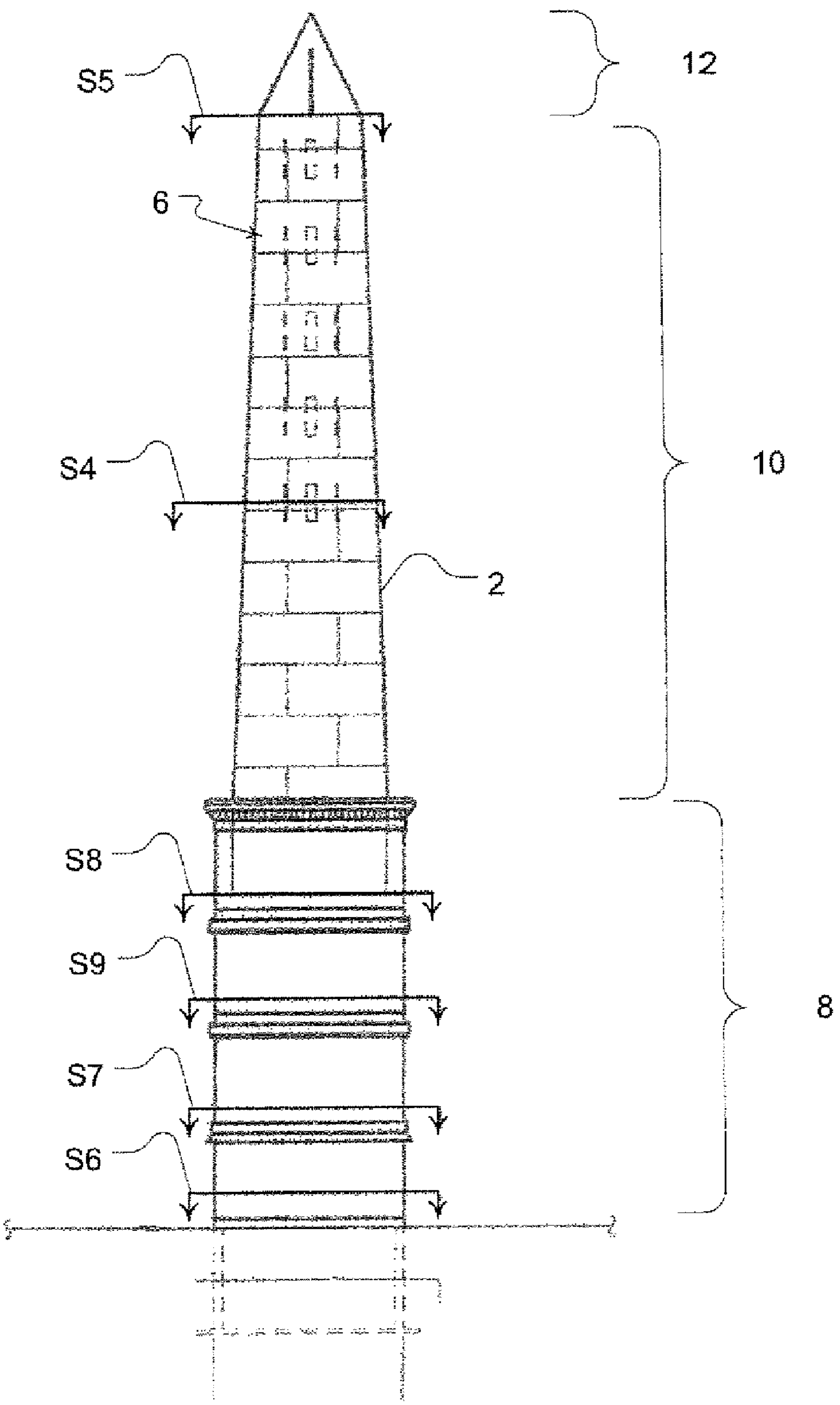
FIG. 1 shows a side elevation view of one embodiment of the telecommunications tower including the outer façade and the base structure and further showing concealed internal antenna arrays.
Figure 2:
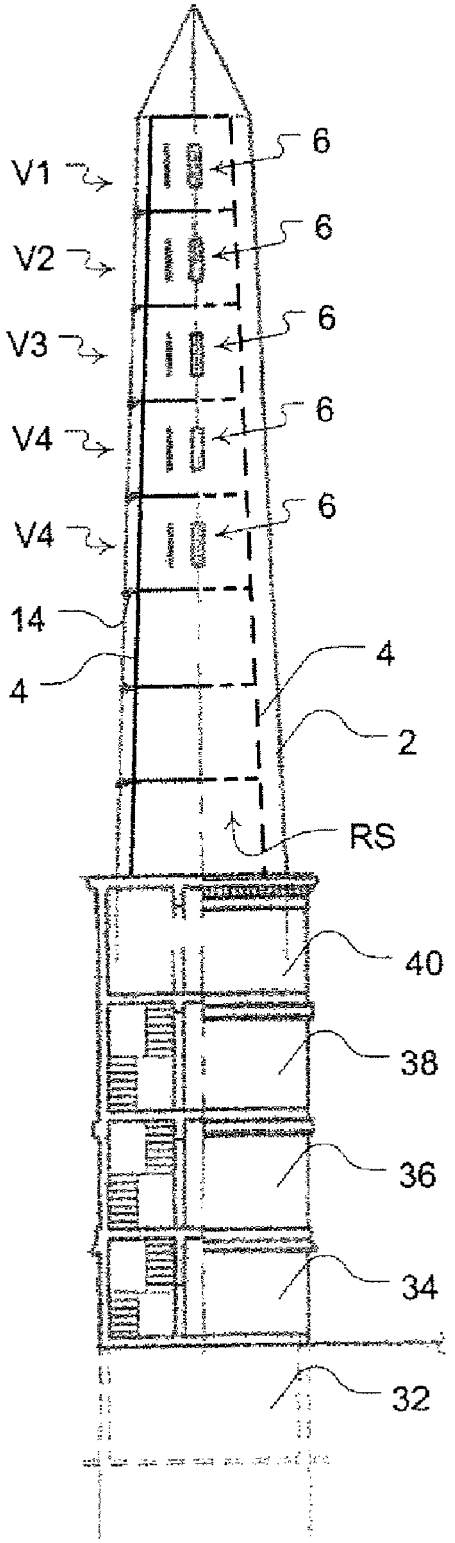
FIG. 2 is a further side elevation view of the telecommunications tower with a partial cross section showing internal antenna arrays and internal frame support structure.
Figure 3:
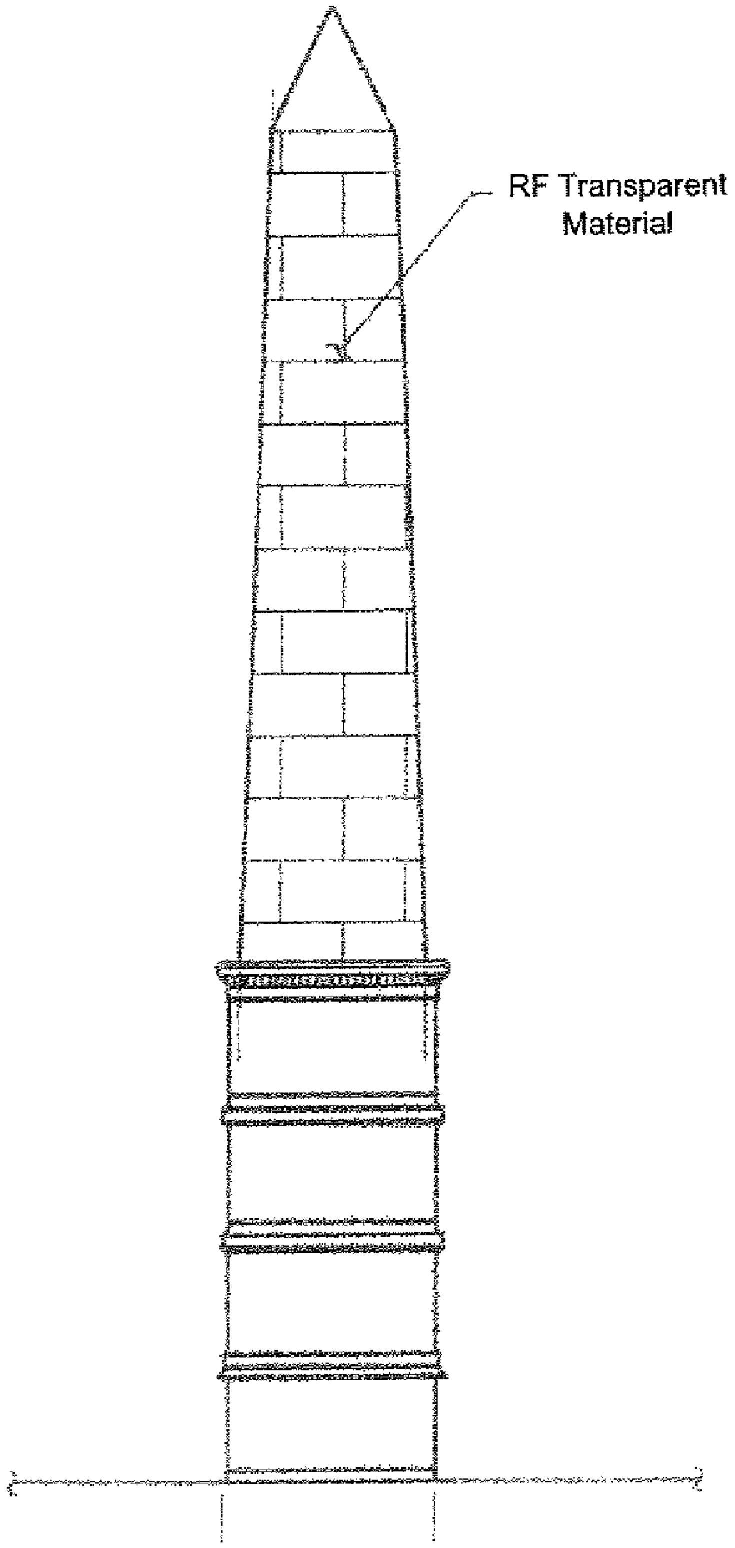
FIG. 3 shows a front elevation view of the telecommunications tower including the outer façade and the base structure.

As illustrated in FIGS. 1, 2 and 3, an example embodiment of the present communications tower technology will typically include an obelisk façade 2, an internal tower frame support structure 4, one or more concealed cellular antenna arrays 6, and a base structure 8.

In such an example embodiment, the obelisk façade will typically be formed by a tower section 10 and a top section 12. The tower section 10 typically includes four tapered exterior walls or surfaces which extend upward (e.g., approximately 80 feet) above the base 8. The top section 12 is connected to the top of the tower and resembles a pyramid with four sloping exterior sides which come to a point above the tower section (e.g., 12 feet above the tower section). In some embodiments, the top section may house one or more antennas which may be utilized for non-commercial communications (e.g., municipal and emergency response antennas).

The outer façade may be designed to compliment the surrounding architecture and landscape. For example, the façade may appear to be of a stone or brick construction. Thus, it has the appearance of an obelisk or monument rather than a communications antenna. However, the entire obelisk façade is typically constructed of radio frequency (RF) transparent material to allow signals to and from cellular or mobile phones with respect to the internal antenna arrays of the obelisk. Accordingly, the tower façade may be a plastic composite material, fiberglass material, etc. or other such material.

Figure 5:
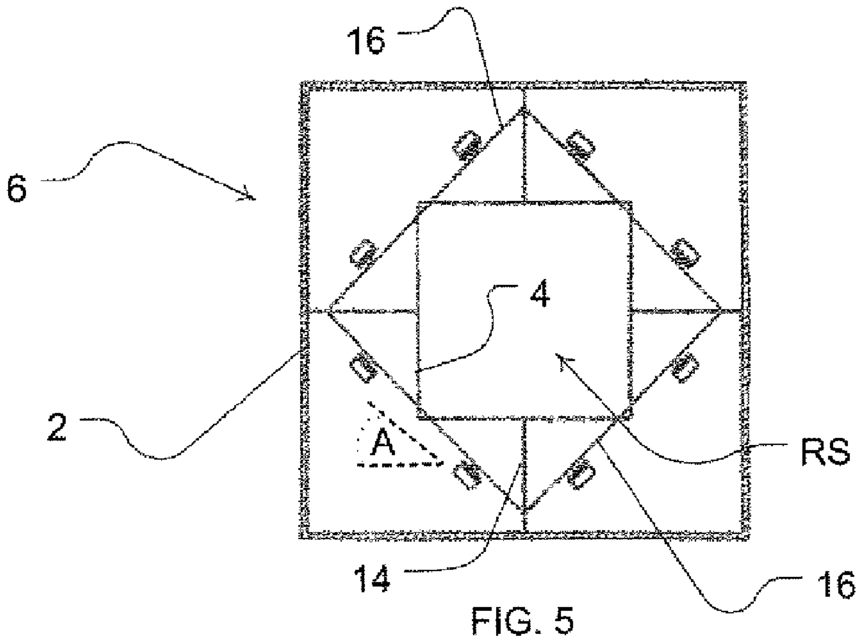
FIG. 5 is a cross sectional view of the tower of FIG. 1 taken along line S5.
Figure 4:
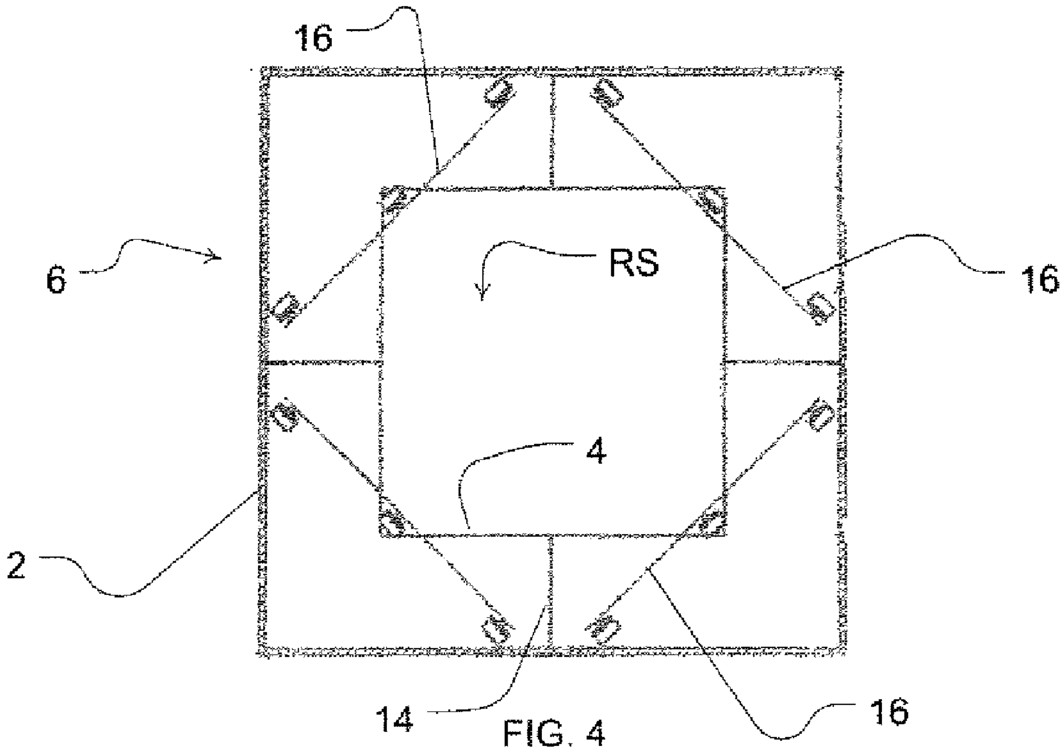
FIG. 4 is a cross sectional view of the tower of FIG. 1 taken along line S4.
Figure 6:
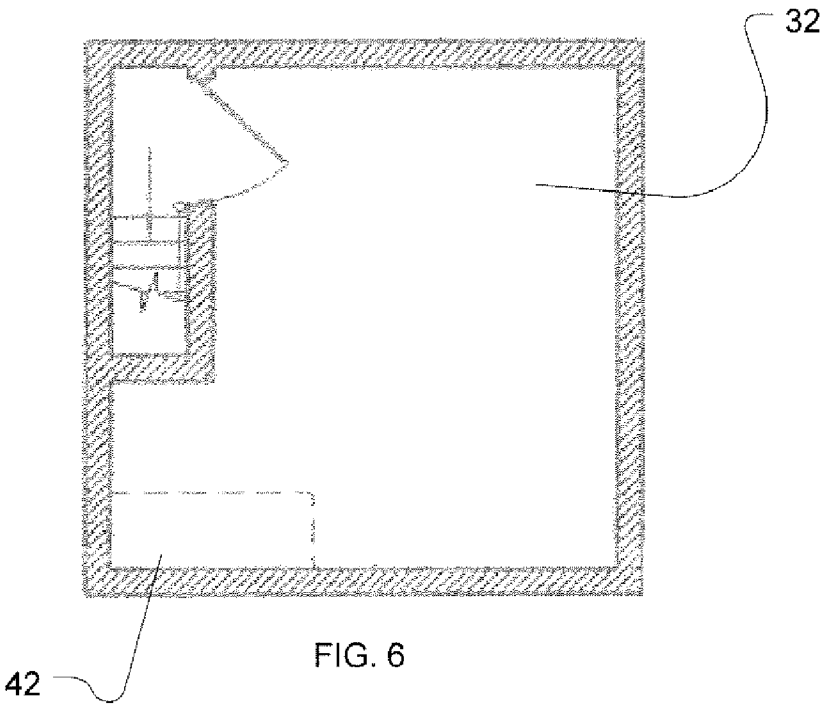
FIG. 6 is a cross sectional view of the tower of FIG. 1 taken along line S6.
Figure 7:
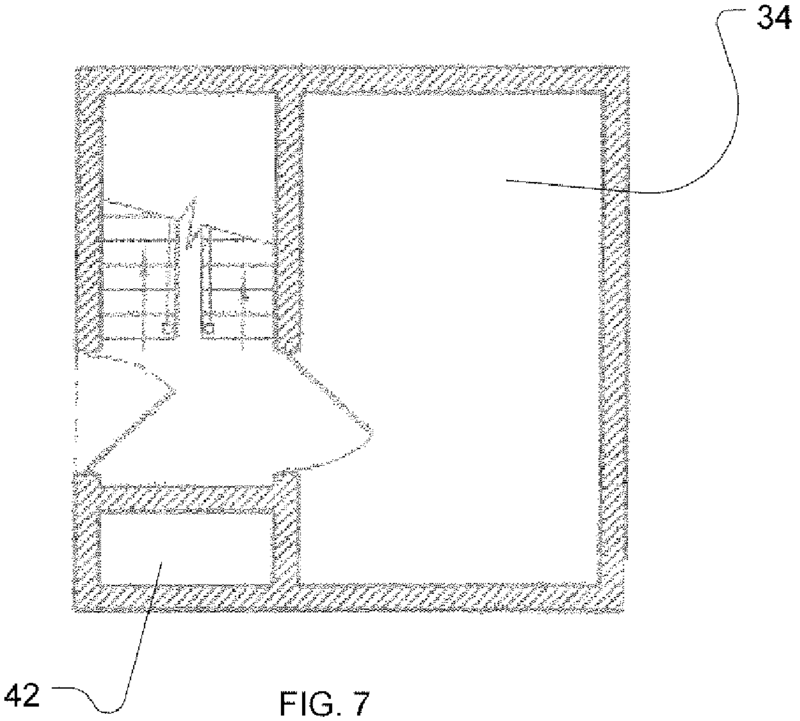
FIG. 7 is a cross sectional view of the tower of FIG. 1 taken along line S7.
Figure 9:
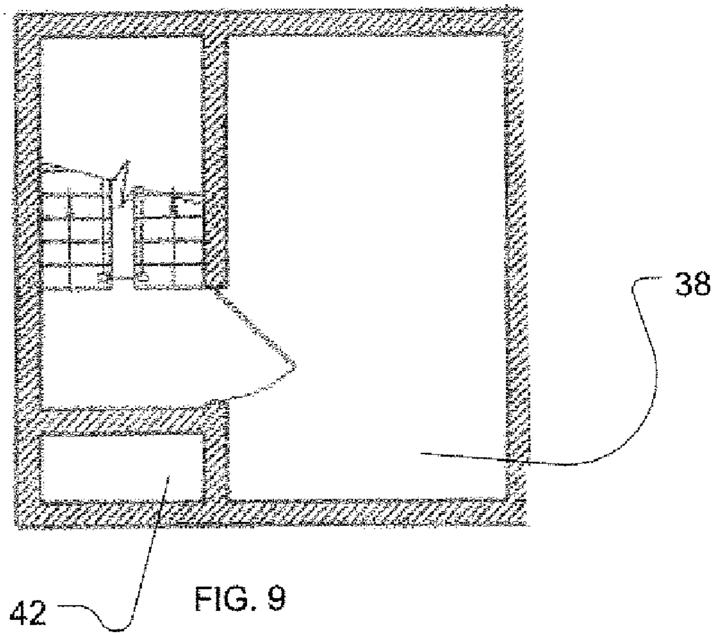
FIG. 9 is a cross sectional view of the tower of FIG. 1 taken along line S9.

In such an example embodiment illustrated in the figures, the outer façade may be supported by an inner tower support frame 4. The inner support frame 4 may be made of steel and provide structure for both the outer façade as well as the antenna arrays and/or supports for the antenna arrays. Thus, the frame 4 may include internal extensions 14 for coupling with one or more panels that form each outer surface of the obelisk façade. For example, panels may be welded, bolted, screwed, etc. or applied by any other fasteners or coupling mechanisms to the extensions 14 or frame 4. Typically, the frame 4 may form a rectangular shaft RS vertically along the obelisk. The shaft may permit human access up through the obelisk. Thus, the frame may also include a climbing device such as a latter to traverse from the bottom of the frame 4 to the top of the frame in the top section of the obelisk. The shaft may also serve as a conduit to run cables from the antenna arrays. As illustrated in FIGS. 4 and 5, the rectangular boundary of the shaft formed by the frame 4 may be substantially aligned with the exterior surfaces of the obelisk facade 2.

In such an example embodiment as illustrated in more detail in FIGS. 4 and 5, a mounting element 16, which may be a rod or bar structure for example, may provide support for one or more concealed or internal cellular antennas and may be constructed within the obelisk façade. They may be configured with or coupled to the internal frame 4. In some embodiments, the cellular antenna array mounting element or support may even be configured to permit installation of the antenna array or a portion of an antenna array at a skew angle A with respect to the inner frame 4 tower support or external surfaces of the obelisk facade. For example, the mounting element may permit the antenna arrays to be mounted at approximately 45 degrees or any other angle with respect a plane of an exterior surface of the façade. Optionally, to permit such skew angles, the mounting element may be adjustable with respect to its coupling to the frame 4 or façade. The mounting elements can further support multiple antennas. Thus, the obelisk may be architecturally oriented to face a direction that is suitable for the aesthetic environment of the obelisk while the mounting elements may then permit other directional adjustment of the antenna arrays to permit adjusting them for the most suitable orientation for engaging in RF communications.

In some embodiments, the frame 4 and mounting elements facilitate sets of antenna arrays 6 to be mounted for different communications networks or different carriers, with each array being attributed to a different carrier network. For example, different arrays may be installed at different sections of the tower. Thus, the frame 4 may form sections V1, V2, V3, V4, V5. Thus, an array of antennas may be located in each section where each section is separated by a vertical distance. For example, each section may permit an included antenna array to be separated from the array of each other section of the tower. A typical minimum vertical separation may be a number of feet (e.g., approximately 10 feet). Each section thus permits different carrier networks and still permits the antennas of each array and their mounting frames to be hidden within a common obelisk façade.

In the illustrated embodiment, the obelisk structure is constructed upon a base 8. The base structure may be further supported by a structural foundation (e.g., steel-reinforced concrete) located below grade. However, the base will typically extend above ground level as illustrated in FIGS. 1 to 3. The base may be formed with concrete, brick or reinforced concrete materials, for example, and will typically be sufficient to provide support for the obelisk façade 2 and frame 4.

Figure 8:
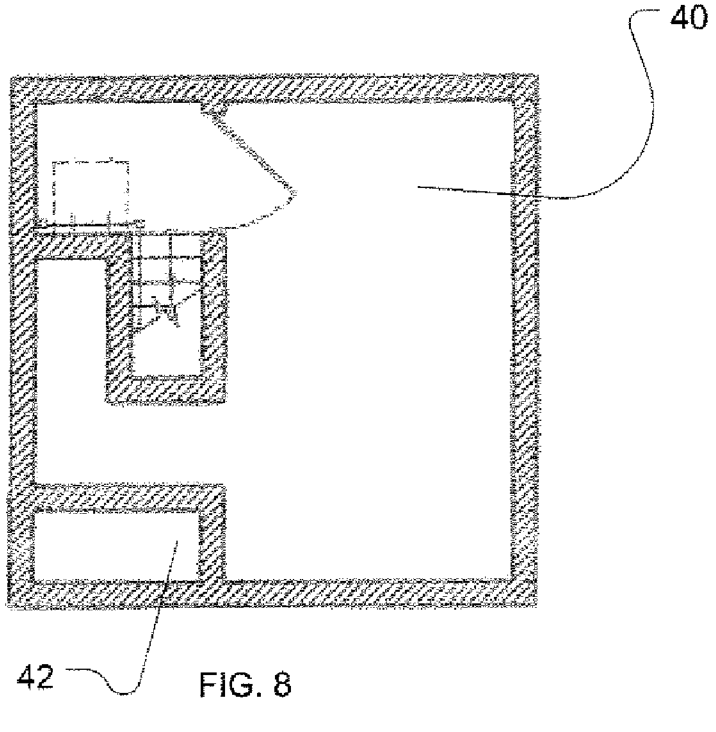
FIG. 8 is a cross sectional view of the tower of FIG. 1 taken along line S8.
Figure 10:
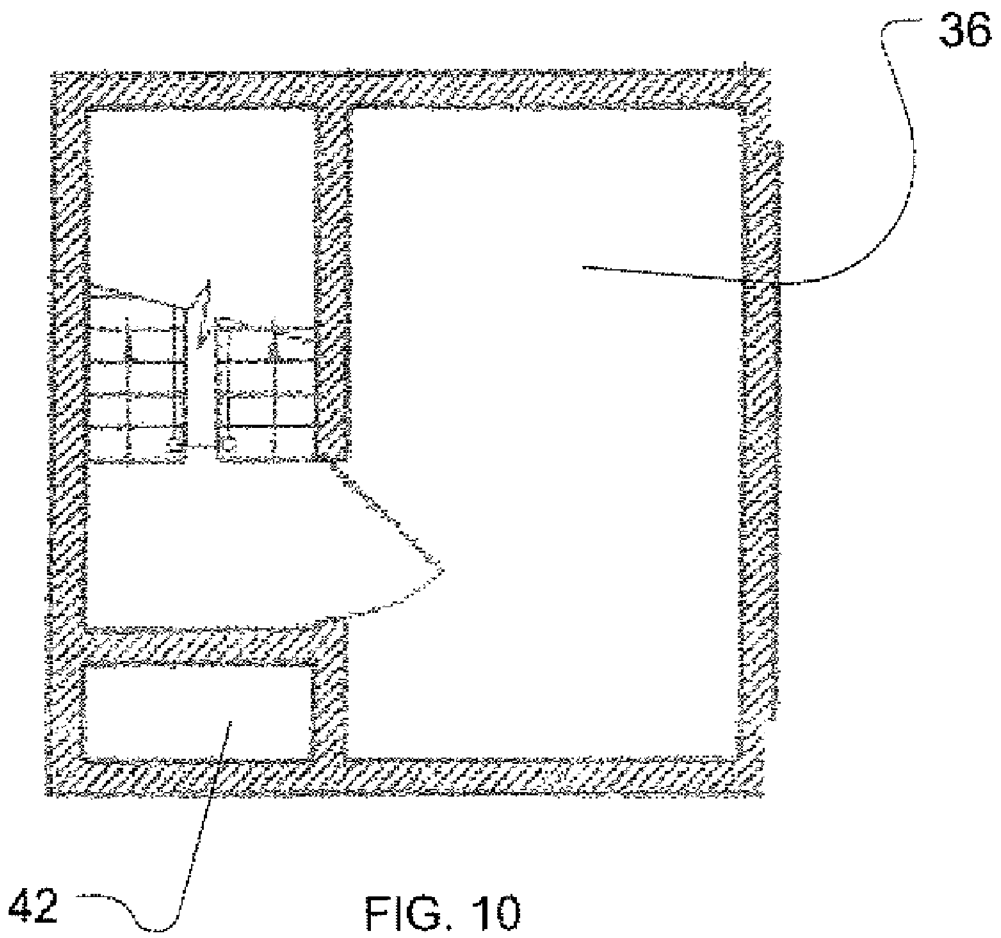
FIG. 10 is a cross sectional view of the tower of FIG. 1 taken along line S10.

In some embodiments, the base 8 structure may include vertical walls of one or more stories in height (e.g., four stories) and may form discrete rooms. Thus, as illustrated in FIGS. 2 and 4-10, the base structure may optionally have a rectangular or square foot print (e.g., 22 feet by 22 feet). However, it may be other shapes such as circular. The base can be constructed with multiple levels 32, 34, 36, 38, 40 (illustrated in FIGS. 6-10), including a below grade or basement level (shown in FIG. 6). Access to the structure may be by an entrance door 30 (e.g., on the first level illustrated in FIG. 7). A typical room on each of the levels will include an equipment room 25 sized for use by telecommunications carriers (e.g., approximately 12 feet by 20 feet). The basement room level 32 is located below the first room level 34 and can be used for storage (e.g., to house the electrical, mechanical and possible municipal needs of the structure). Each level includes a staircase or ladder (e.g., a steel stair case) to provide access from each higher or lower level. As illustrated in FIG. 8, the top floor room below the obelisk and frame may have a further hatch, port, doorway or access aperture to provide human access to the shaft formed by the frame 4 within the obelisk façade 2. The opening may also include an additional structure (e.g., a ladder or stairs) to allow for easier access.

Each level will also typically have access to a chute 42. The chute may provide a continuous conduit through the levels to the shaft of the obelisk. Thus, the chute can permit telecommunications tower's wiring, cables and utility conduits to be run from the antenna arrays to the communications or network infrastructure equipment. For example, coaxial cables to connect the cellular antennas to the support equipment located within the equipment rooms may traverse through the chute.

Each level above the basement and corresponding equipment room can be utilized by a different telecommunications carrier or network to permit collocation of multiple carriers.

However, in other embodiments, the base 2 may simply be a solid structure with a shaft or conduit for communications related cables to the antenna arrays. The base may further include an access port for the cables to link with external communications equipment that may be house in another structure.

In the foregoing description and in the accompanying drawings, specific terminology, dimensions, equations and drawing symbols are set forth to provide a thorough understanding of the present technology. In some instances, the terminology and symbols may imply specific details that are not required to practice the technology. For example, the dimensions of the illustrated embodiments of the figures are exemplary. Other dimensions may be utilized to construct the obelisk and base. Moreover, although the technology herein has been described with reference to particular embodiments, it is to be understood that these embodiments are merely illustrative of the principles and applications of the technology. It is therefore to be understood that numerous modifications may be made to the illustrative embodiments and that other arrangements may be devised without departing from the spirit and scope of the technology.

The invention claimed is:

1. A radio communications apparatus comprising:

an internal tower support frame forming an internal vertical shaft having a rectangular boundary;

a radio frequency transparent façade, the façade and internal tower support frame coupled together to form an obelisk having a monolithic exterior shaft comprising four upwardly tapering side surfaces and top pyramid surfaces, and the rectangular boundary of the internal tower support frame is substantially aligned with the four side surfaces of the exterior shaft of the obelisk;

an antenna array within the obelisk and coupled to at least one antenna support of the internal tower support frame;

a base structure, the base structure supporting the internal tower support frame, the base structure comprising a communications equipment room; and a set of antenna array supports coupled to the internal tower support, each antenna array support of the set of antenna array supports is aligned at a skewed angle with respect to the four side surfaces of the exterior shaft of the obelisk.

2. The radio communications apparatus of claim 1 wherein the base structure comprises a plurality of communications equipment rooms.

3. The radio communications apparatus of claim 2 wherein the plurality of communications equipment rooms are vertically stacked upon each other.

4. The radio communications apparatus of claim 3 wherein the internal tower support frame comprises a plurality of antenna arrays.

5. The radio communications apparatus of claim 2 wherein the internal tower support frame comprises supports for a plurality of antenna arrays.

6. The radio communications apparatus of claim 5 wherein the supports for each antenna array are separated by a vertical distance along the internal tower support frame.

7. The radio communications apparatus of claim 1 wherein the communications equipment room comprises a communications cable aperture formed to permit cable access between the communications equipment room and the internal vertical shaft.

8. The radio communications apparatus of claim 1 wherein the skewed angle is approximately 45 degrees.

9. The radio communications apparatus of claim 1 wherein the antenna array is a cellular phone network antenna array.

* * * * *